(12) United States Patent
Shen

(10) Patent No.: US 6,192,925 B1
(45) Date of Patent: Feb. 27, 2001

(54) FLOW REGULATOR FOR WATER PUMP

(76) Inventor: Der-Fan Shen, 5F, No. 40, Fentzu Wei Chieh, Shan-Chung City, Taipei Hsien (TW)

( * ) Notice: Subject to any disclaimer, the term of this patent is extended or adjusted under 35 U.S.C. 154(b) by 0 days.

(21) Appl. No.: 09/414,011

(22) Filed: Oct. 6, 1999

(51) Int. Cl.[7] .................................................. G05D 16/08
(52) U.S. Cl. .............................. 137/505.38; 137/565.13; 251/123; 417/295
(58) Field of Search ........................ 137/565.13, 505.38, 137/501; 251/123; 417/295

(56) References Cited

U.S. PATENT DOCUMENTS

| | | | |
|---|---|---|---|
| 868,216 | * 10/1907 | Pietzuch | 137/505.38 |
| 1,025,222 | * 5/1912 | Wallace | 417/295 |
| 1,089,083 | * 3/1914 | Reichert | 417/295 |
| 4,250,915 | * 2/1981 | Rikuta | 137/501 |
| 4,813,853 | * 3/1989 | Otto et al. | 417/295 |

* cited by examiner

Primary Examiner—Stephen M. Hepperle
(74) Attorney, Agent, or Firm—Pro-Techtor International Services

(57) ABSTRACT

A flow regulator for a water pump, working in conjunction with a water pump, having a pump, an inlet pipe, an outlet pipe with a water pressure, and a container. The flow regulator comprises: a main body, installed at the inlet pipe and having a passageway for water flowing through the inlet pipe; a chamber inside the main body; a connecting pipe, conducting the water pressure in the outlet pipe through an entrance on the main body to the chamber; and a control element, mounted inside the chamber and glidingly movable therein back and forth. The water pressure causes the control element to move within the chamber, adjusting the width of the passageway and controlling the flow of water through the water pump. This allows to extend start-stop cycles of the pump.

3 Claims, 5 Drawing Sheets

FLOW REGULATOR FOR WATER PUMP

BACKGROUND OF THE INVENTION

1. Field of the Invention

The present invention relates to a flow regulator for a water pump, which works by stabilizing the pressure difference between inlet and outlet of the water pump.

2. Description of Related Art

The water supply of modern high-rise buildings at times is not sufficient for a steady flow of water or, on the contrary, water pressure is too high, resulting in water splashing out of taps. For this reason, often water pumps are installed generating a controlled water pressure within a certain range.

Methods for regulating water pressure generated by a water pump with a motor include regulating the speed of the motor and turning the motor on and off to keep the water pressure within a pressure range.

A start-stop system for regulating water pressure mainly comprises a water pump, a pressure-sensitive switch at the outlet of the water pump, and a container. The pressure-sensitive switch detects the water pressure at the outlet of the water pump and determines the pressure range. When the water pressure falls below a lower threshold, the pressure-sensitive switch turns on the pump, increasing the water pressure in the outlet. After the water pressure has risen above an upper threshold, the pressure-sensitive switch turns off the pump. The container is installed at the outlet, storing water when the pump is turned on and releasing water when the pump is turned off. Thus the water pressure will not change rapidly, and start-stop intervals of the water pump are lengthened.

A speed-regulating system for maintaining a constant water pressure has a motor, a pressure sensor and a speed controller, which regulates the speed of the motor according to pressure values read by the pressure sensor. Thus a stable water pressure is maintained.

As compared to a speed-regulating system, a conventional start-stop system has a motor with fixed speed which is just regulated by being turned on and off. After turning on the pump, an excess outflow of water resulting in too high a pressure leads to instant turning off of the pump. Start-stop cycles of the pump easily get too short, too much energy is consumed, and the lifetime of the pump is adversely affected. Furthermore, an excess outflow of water will obstruct the pump outlet, increasing the pressure therein, as well as load on the pump and energy consumption. Therefore, a start-stop system ideally is used with pumps that deliver about as much water as is needed for the intended water supply, such that turning on the pump lets the water pressure increase only slowly and short start-stop cycles are avoided.

Since the motor of a start-stop system, when turned on, operates at a fixed speed, resulting in a constant delivered quantity of water, but demand in a large building varies with time, the pump has to be sufficiently large. Most of the time, however, demand for water is low, and a large pump is a waste of resources. In addition, pressure generated by a large pump will not be stable.

On the other hand, a speed-regulating system allows quickly to adapt the delivered water quantity to needs, avoiding the shortcoming of start-stop systems. However, the components of a speed-regulating system, a speed-regulated motor and a speed controller, are expensive and need maintenance by qualified personnel. Costs of a speed-regulated system exceed that of a start-stop system and are too large a burden for small buildings. For this reason, speed-regulated systems are generally used only in large buildings.

SUMMARY OF THE INVENTION

The main object of the present invention is to provide a flow regulator for a water pump, which avoids too short start-stop cycles, saving energy and increasing the lifetime of the water pump.

Another object of the present invention is to provide a flow regulator for a water pump, which allows to regulate the flow of water at the inlet of the water pump to accommodate variations in demand of water.

The present invention can be more fully understood by reference to the following description and accompanying drawings.

DETAILED DESCRIPTION OF THE PREFERRED EMBODIMENT

Figure 1:
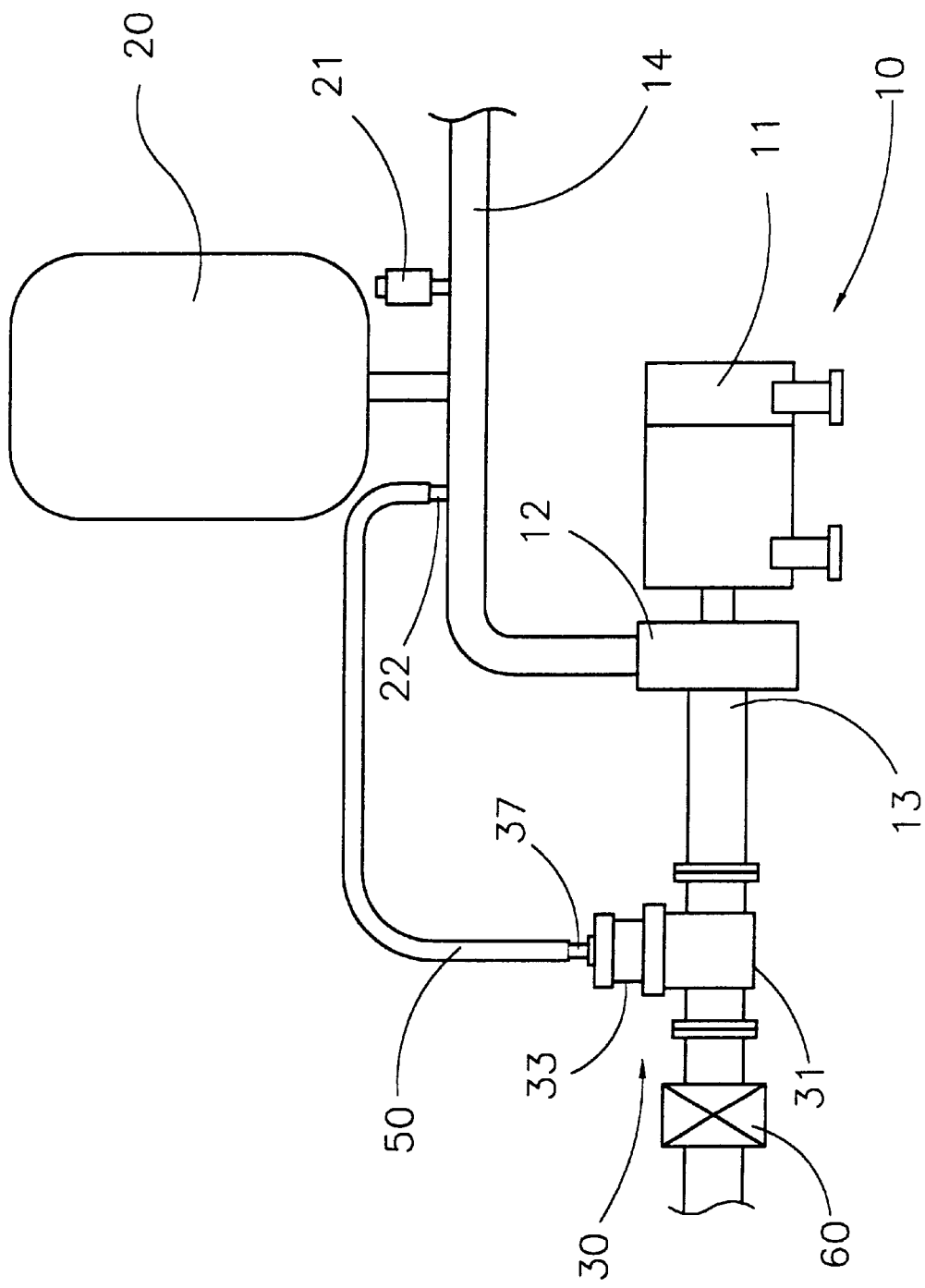
FIG. 1 is a schematic illustration of the flow regulator for a water pump of the present invention in conjunction with a water pump.

As shown in FIG. 1, the flow regulator for a water pump of the present invention is used in conjunction with a water pump 10, a container 20, a pressure-sensitive switch 21; and a blocking valve 60. The water pump 10 has a motor 11; a pump 12, driven by the motor 11 and having an inlet and an outlet; a water inlet pipe 13, installed between the inlet of the pump 12 an a water supply; and a water outlet pipe 14, attached to the outlet of the pump 12 containing water with a water pressure to be led to delivery pipes.

The container 20 is mounted on the water outlet pipe 14. When the pump 12 is turned on, water enters the container 20. When the pump 12 is turned off, water from the container 20 replenishes the quantity of water in the delivery pipes, smoothing decrease of water pressure and avoiding to have to turn on the pump 12 again immediately. The pressure-sensitive switch 21 sits on the water outlet pipe 14, detecting the water pressure therein and controlling turning on and off of the motor 11 of the water pump 10.

The flow regulator for a water pump of the present invention mainly comprises a control valve 30 and a connecting pipe 50.

The control valve 30 is mounted on the water inlet pipe 13, controlling an inlet flow of water to the inlet of the pump 12. As shown in FIG. 1, the control valve 30 has an entrance 37, leading to the connecting pipe 50. The connecting pipe 50 conducts the water pressure from the outlet pipe 14 through a pressure outlet 22 back to the control valve 30 through the entrance 37.

The main characteristic of the present invention is that the water pressure in the water outlet pipe 14 controls the control valve 30, thus regulating the inlet flow of water according to demand of the delivery pipe. If, for instance, demand of the delivery pipe is high, the water pressure in the water outlet pipe 14 decreases, the control valve 30 opens further, and the inlet flow increases. On the other hand, if demand of the delivery pipe lowers, the water pressure in the water outlet pipe 14 increases, and the control valve 30 reduces the inlet flow. Then the water pressure in the outlet pipe 14 increases only gradually, and the start-stop cycles of the water pump 10 are extended. The blocking valve 60 blocks a counterflow of water from the water outlet pipe 14 and the control valve 30.

Figure 2:
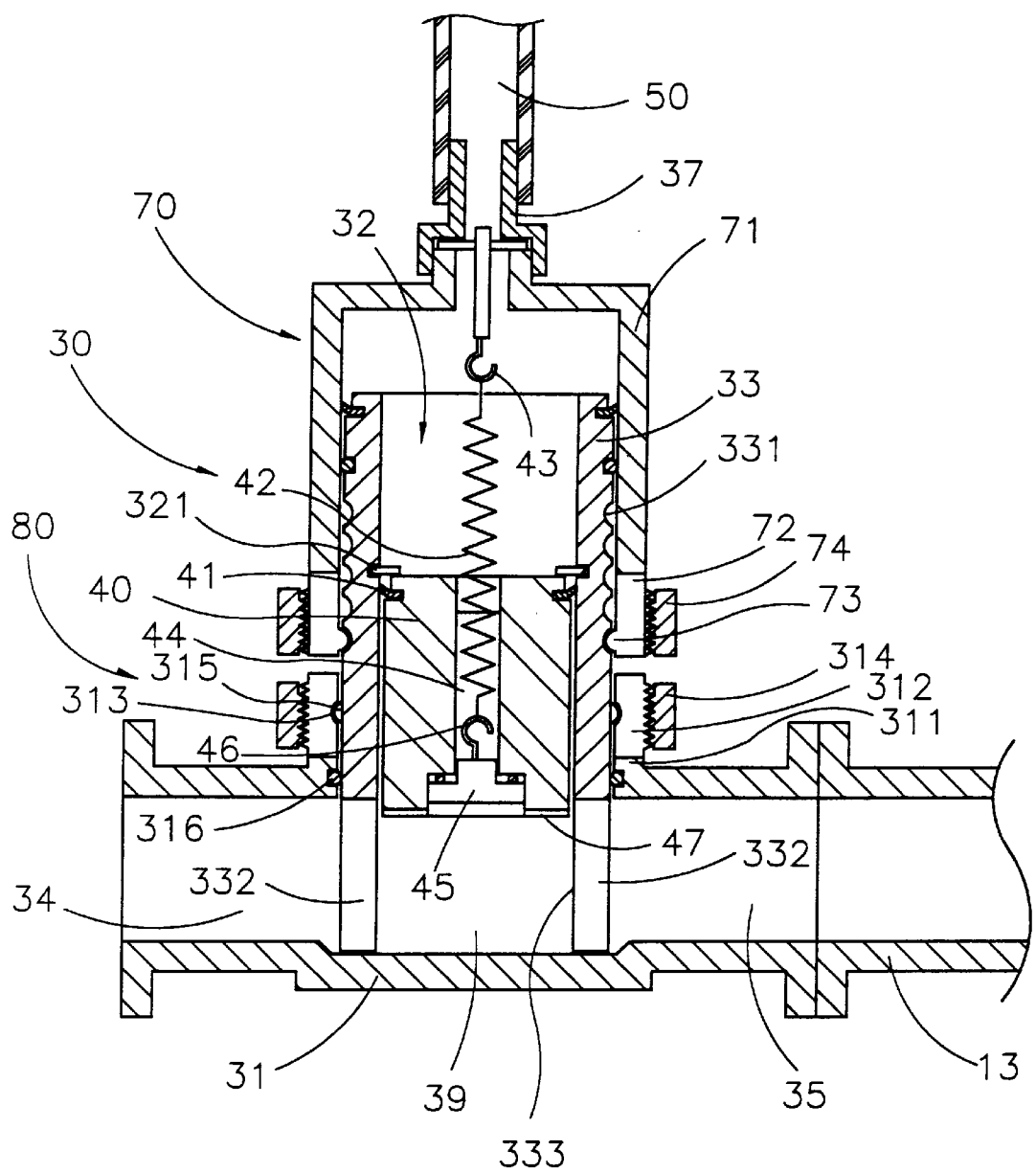
FIG. 2 is a sectional side view of the flow regulator for a water pump of the present invention.

Referring to FIG. 2, the control valve 30 comprises: a main body 31 with a main axis, defining a vertical direction, a top and a lower side, further having a passageway 39 on the lower side; a valve inlet 34 and a valve outlet 35, mounted on two opposite sides of the main body 31 at the lower side thereof, connecting the valve inlet 34 and the valve outlet 35 and conducting water to the water inlet pipe 13; a sleeve 33 with a top side, a bottom side and a peripheral outer side, set on the main body 31 from above and surrounding a chamber 32 with an inner wall; a control element 40, having a bottom, glidingly movable in the chamber 32 in the vertical direction and sealed against the inner wall of the chamber 32 by several sealing rings 41; a blocking ring 321, mounted on the inner wall of the chamber 32 and blocking the control element 40 from moving above an uppermost position; and a spring 42. The entrance 37 is located above the sleeve 33. As shown in FIG. 1, the entrance 37 leads the water pressure from the outlet pipe 14 through the pressure outlet 22 and the connecting pipe 50 into the chamber 32.

The spring 42 has a lower end, connected with the control element 40, and an upper end, connected with a adjustable cover 71 (further explained below) on the top side of the main body 31, held by a hook 43. Thus, a downward and upward movement of the control element 40 within the chamber 32 lengthens and shortens the spring 42.

A vertical channel 44 passes through the control element 40 along the main axis, accommodating the spring 42 and having a lower end, which is covered from below by a plug 45. The plug 45 seals the lower end of the channel 44, preventing water from leaking out. The plug 45 has an upper side, to which a hook 46 is attached. The hook 46 holds the lower end of the spring 42. When the control element 40 is pushed down by the water pressure, the spring 42 is stretched, developing an elastic force.

Figure 3:
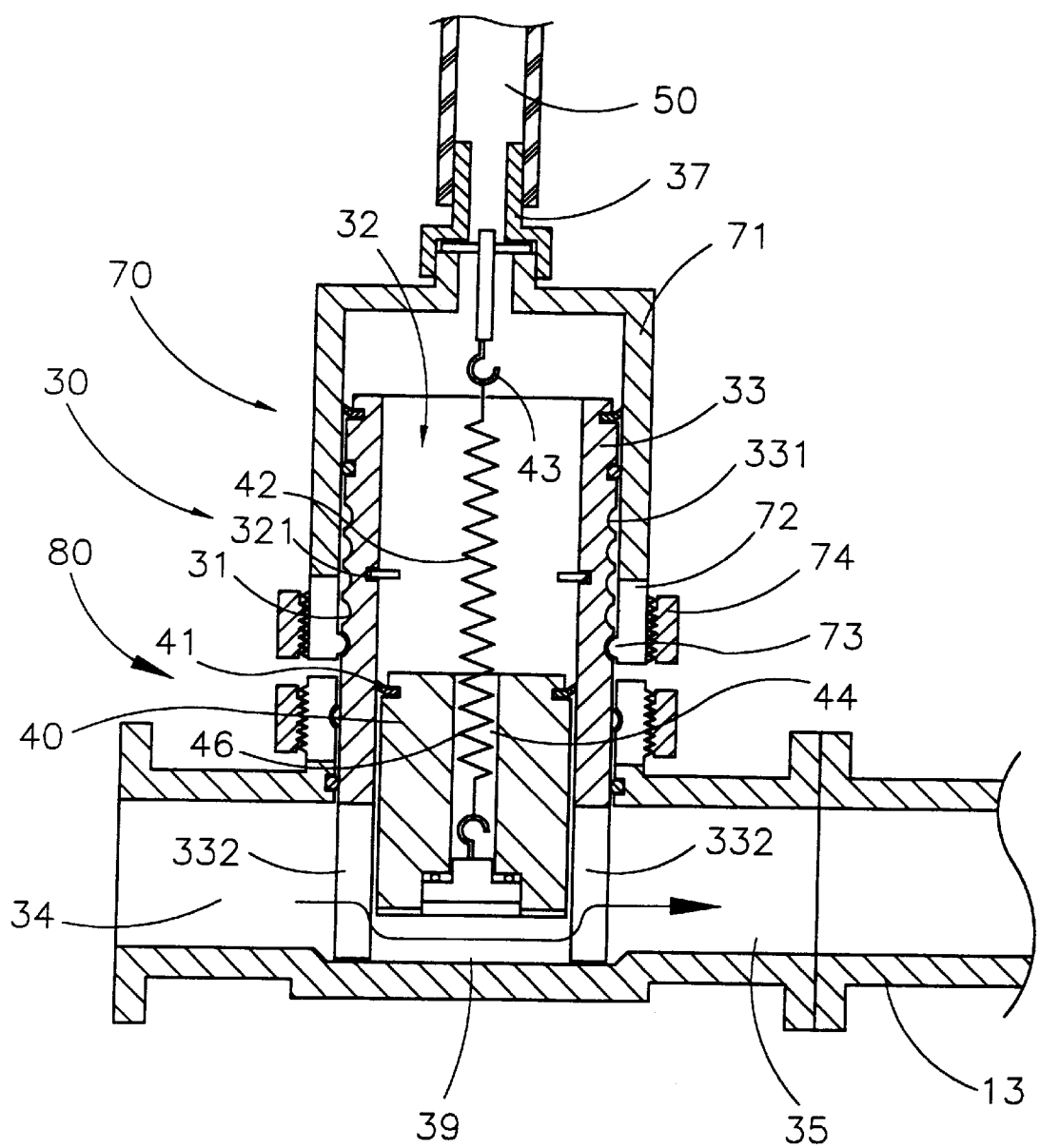
FIG. 3 is a schematic illustration of the movement of the present invention.

The entrance 37 is located above the control element 40. When the water pressure from the water outlet pipe 14 is conducted to the chamber 32, the control element 40 is pushed downward. As shown in FIG. 2, the bottom of the control element 40 extends to the passageway 39. With the control element moving downward and upward, the passageway 39 is narrowed and widened, respectively. When the pump 12 delivers less water than demanded and the water pressure from the outlet pipe 14 decreases, the control element 40 is pushed upward by the elastic force of the spring 42, widening the passageway 39 and causing the inlet flow to increase. On the other hand, as shown in FIG. 3, when the pump 12 delivers more water than demanded and the water pressure from the outlet pipe 14 increases, the control element 40 is pushed downward, narrowing the passageway 39 and causing the inlet flow to decrease.

Figures 4, 5:
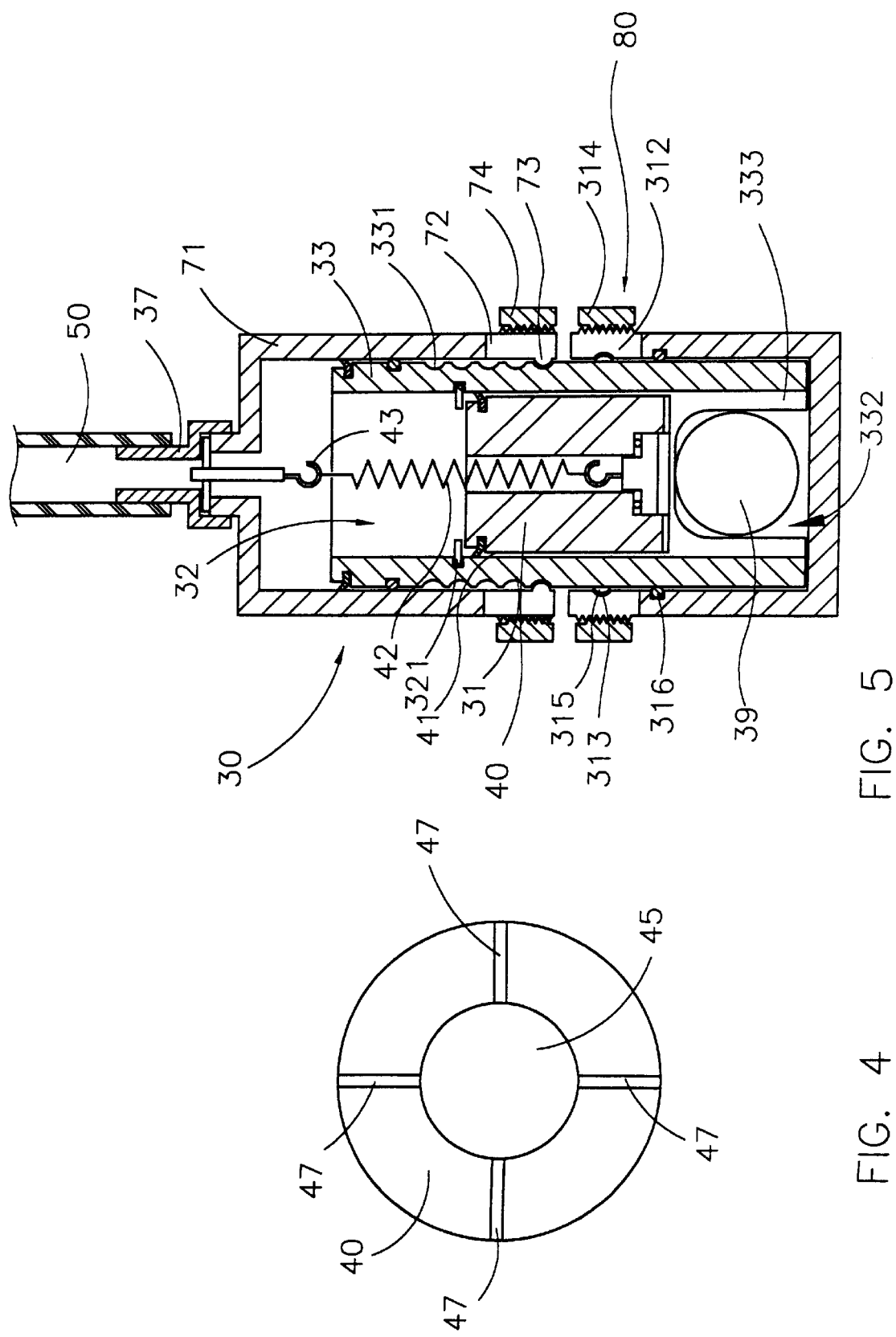
FIG. 4 is a bottom view of the control element of the present invention.
FIG. 5 is a cross-sectional view of the control valve of the present invention.
Figure 6B:
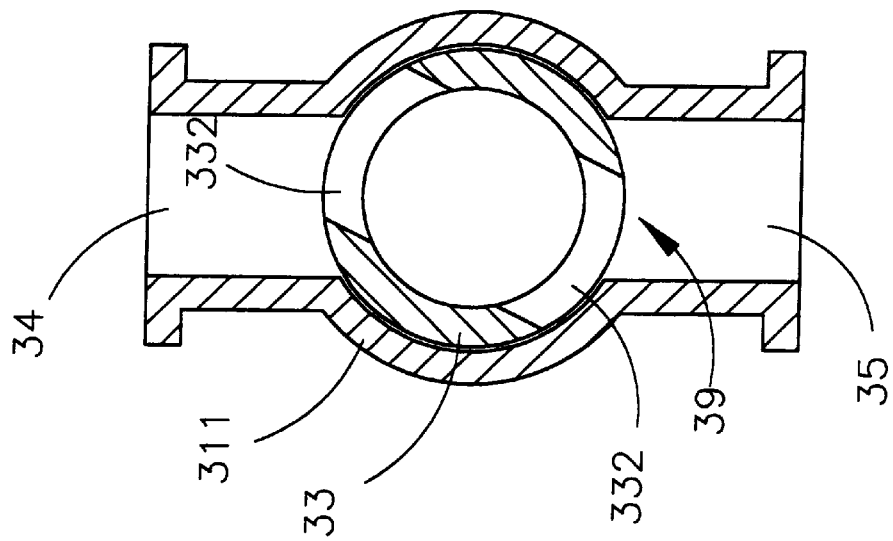
FIGS. 6A and 6B are schematic illustrations of the movement of the flow regulating device of the present invention.
Figure 6A:
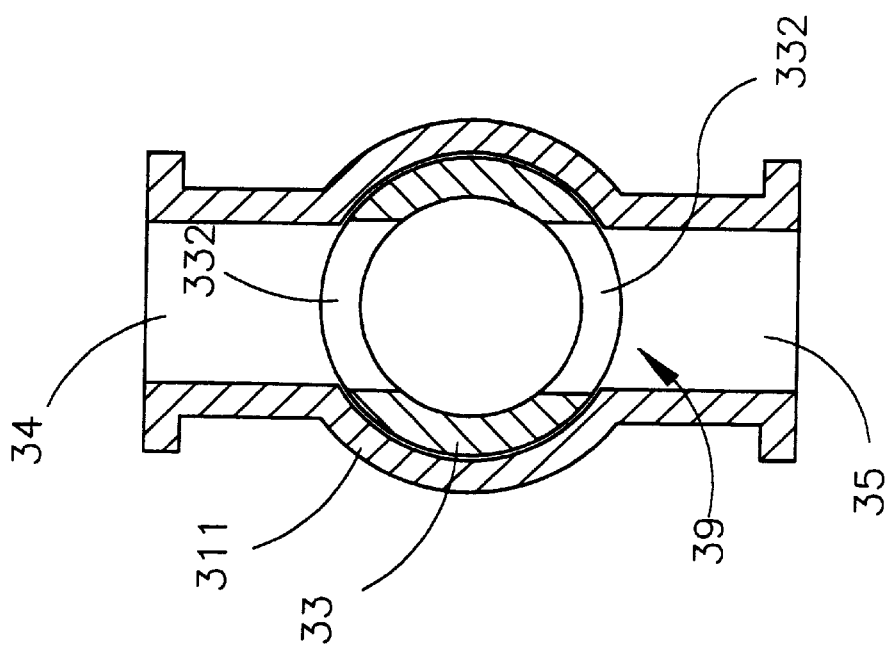

Referring to FIG. 4, several flow grooves 47 are cut into the bottom of the control element to ensure that even in an extreme lower position of the control element 40 some water reaches the pump 12 through the inlet pipe 13. As shown in FIG. 1, the blocking valve 60 at the valve inlet 34 blocks any counterflow of water from the water outlet pipe 14 and the control valve 30.

Controlling the inlet flow according to the water pressure by the control valve 30 requires proper adjusting of the spring 42. Since different types of pumps generally produce different water pressures, various types of pumps need various adjustments of the spring 42, so as to have a proper width of the passageway 39 at a given water pressure resulting in the desired inlet flow.

Referring again to FIG. 2, adjusting of the elastic force of the spring is done by an adjusting device 70. The adjusting device 70 comprises: the adjustable cover 71, mounted on the sleeve 33 at an adjustable vertical position and having a top side, from which the hook 43 extends downward, a bottom side, and a periphery; and a fixing device, fixing the vertical position of the adjustable cover 71 on the sleeve 33.

The fixing device comprises: several holding grooves 331 on the peripheral outer side of the sleeve 33; a plurality of elastic bottom strips 72, attached to the bottom side of the adjustable cover 71 and giving the adjustable cover an elastically variable lowermost diameter; and a plurality of holding elements 73, protruding inward from the bottom strips 72. The plurality of holding elements 73 hold the adjustable cover 71 in one of the holding grooves 331, fixing the vertical position of the adjustable cover 71. For changing the vertical position of the adjustable cover 71, the plurality of holding elements 73 are moved to another of the holding grooves 331.

The adjustable cover 71 has a thread on the periphery close to the bottom side thereof, on which a securing ring 74 is set. Fastening the securing ring 81 on the thread of the adjustable cover 71 keeps the plurality of holding elements 73 in one of the holding grooves 331, fixing the vertical position of the adjustable cover 71. Loosening the securing ring 74 allows the plurality of bottom strips 72 to move outward and thus the plurality of holding elements 73 to move between the holding grooves 331, so as to change the vertical position of the adjustable cover 71.

Raising the vertical position of the adjustable cover 71 lengthens the spring 42 and thus increases the elastic force of the spring 42. On the other hand, lowering the vertical position of the adjustable cover 71 shortens the spring 42 and thus decreases the elastic force of the spring 42. Thus the vertical position of the adjustable cover 71 is adjusted to a value at which for a given desired inlet flow the elastic force of the spring 42 matches the corresponding appropriate water pressure.

Since types of pump show a great variety, a large range of water pressures and inlet flows need to be adapted to each other, which possibly exceeds the range of pressure adjustments offered by the adjusting device 70. Therefore, preferably a flow regulating device 80 is installed in the passageway 39, regulating the maximum flow through the passageway 39.

The sleeve 33 has two openings 332 close to the bottom side on opposite sides. When the control valve 30 is not sufficient to vary the inlet flow to the pump 12, the sleeve 33 is manually turned around the main axis, turning the openings 332 in and out of the passageway 39, changing the cross-section of the passageway 39 available for the inlet flow.

The top of the main body 31 is formed as a seat 311, having a top side, on which an angular positioning device is mounted for turning the sleeve 33 around the main axis. The angular positioning device comprises: several strips 312, extending upward from the top side of the seat 311 and having an inner periphery; a accommodating groove 313 on the inner periphery of the strips 312; and a securing ring 314, surrounding the seat 311. A peripheral projection 315 protrudes from the outer side of the sleeve 33, fitting into the accommodating groove 313 of the seat 31 and held therein.

The strips 312 allow to change the diameter of the seat on the top thereof elastically. The securing ring, when fastened, presses on the strips 312 from outside and holds the projection 315 in the accommodating groove 313. A sealing ring 316 between the outer side of the sleeve 33 and the seat 311 on an inner periphary thereof prevents water in the passageway 39 from leaking.

The turning device allows to turn the sleeve 33 around the main axis, with the projection 315 gliding in the accommodating groove 313, and to fix the angular position of the sleeve 33 when appropriate, so as to operate at an optimum available cross-section of the passageway 39.

While the invention has been described with reference to a preferred embodiment thereof, it is to be understood that modifications or variations may be easily made without departing from the spirit of this invention which is defined by the appended claims.

What is claimed is:

1. A flow regulator for a water pump, working in conjunction with a water pump, having a pump, an inlet pipe conducting an inlet flow of water to said pump, an outlet pipe conducting water with a water pressure, and a container, said flow regulator comprising:

a main body with a top side, installed at said inlet pipe and having a passageway for water flowing through said inlet pipe;

a sleeve, mounted on said top side of said main body, being rotatable around a main axis, having an inside with a chamber and a lower side extending into said passageway with opposite openings, which are turned in and out of said passageway by rotating said sleeve around said main axis;

an entrance on said main body, conducting said water pressure in said outlet pipe to said chamber;

a control element, mounted inside said chamber and glidingly movable therein back and forth, thereby narrowing and widening said passageway, respectively, regulating said inlet flow, with said water pressure causing said control element to move within said chamber such that said passageway is narrowed; and a spring, exerting an elastic force on said control element, countering said water pressure, such that when said water pressure decreases said passageway is widened;

wherein, by rotating said sleeve around said main axis, said passageway is widened or narrowed, regulating said inlet flow.

2. A flow regulator for a water pump according to claim 1, further comprising an angular positioning device to adjust and fix an angular position of said sleeve.

3. A flow regulator for a water pump according to claim 2, wherein said angular positioning device further comprises:

a seat on said top side of said main body, surrounding said sleeve, having an inner periphery and a top side with a plurality of strips, surrounding said sleeve with a variable diameter;

a peripheral accommodating groove on said inner periphery of said seat;

a peripheral projection around said sleeve, fitting into said accommodating groove; and a securing ring, surrounding said seat, keeping said peripheral projection in said accommodating groove.

* * * * *